(12) United States Patent
Takada

(10) Patent No.: US 8,571,337 B2
(45) Date of Patent: Oct. 29, 2013

(54) ENCODING METHOD, ENCODING DEVICE, AND ENCODING PROGRAM FOR ENCODING INTERLACED IMAGE

(75) Inventor: Yousuke Takada, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 262 days.

(21) Appl. No.: 13/061,484

(22) PCT Filed: Aug. 29, 2008

(86) PCT No.: PCT/JP2008/066022
§ 371 (c)(1),
(2), (4) Date: Apr. 15, 2011

(87) PCT Pub. No.: WO2010/023769
PCT Pub. Date: Mar. 4, 2010

(65) Prior Publication Data
US 2011/0188764 A1    Aug. 4, 2011

(51) Int. Cl.
*G06K 9/36* (2006.01)
*G06K 9/46* (2006.01)

(52) U.S. Cl.
USPC .......................................... 382/240; 382/248

(58) Field of Classification Search
USPC ......................................... 382/232, 240, 248
See application file for complete search history.

(56) References Cited

U.S. PATENT DOCUMENTS 5,798,794 A * 8/1998 Takahashi ................ 375/240.11

FOREIGN PATENT DOCUMENTS

WO    2010023769 A1    3/2010

OTHER PUBLICATIONS

International Search Report and Written Opinion for International Application No. PCT/JP2008/066022 dated Jun. 25, 2009.
Huang et al., "Color Image Denoising with wavelet thresholding based on human visual system model" Visual Communications and Image Processing; Aug. 7, 2003-Nov. 7, 2003; Lugano, Jul. 8, 2003; XP030080784, pp. 1667-1676.
Huh et al., "The New Extended JPEG Coder with Variable Quantizer Using Block Wavelet Transform" <This work was supported by Korea Academic Foundations, Grant No. 02-E-0082>, Aug. 1, 1997, vol. 43, No. 3, pp. 401-409, XP011083551.
International Preliminary Report on Patentability in International Application No. PCT/JP2008/066022 issued Mar. 1, 2011.

* cited by examiner

*Primary Examiner* — Phuoc Tran
(74) *Attorney, Agent, or Firm* — Arent Fox LLP

(57) ABSTRACT

It is an object of the present invention to provide an encoding method, an encoding device, and an encoding program for encoding an interlaced image in a simple and effective manner. The encoding method includes: a frequency conversion step (s101) of converting the interlaced image to coefficients of frequency domain having predetermined frequency ranges in a vertical direction and a horizontal direction, respectively; and a weighting step (s102) of weighting the coefficients of frequency domain for each frequency band. In the weighting step, a weighting factor used for weighting a coefficient of a frequency band exceeding a predetermined frequency in the vertical direction is substantially equal to or larger than a weighting factor used for weighting a coefficient in a frequency band exceeding the predetermined frequency in the horizontal direction.

8 Claims, 16 Drawing Sheets

TREE-STRUCTURED FILTER BANK

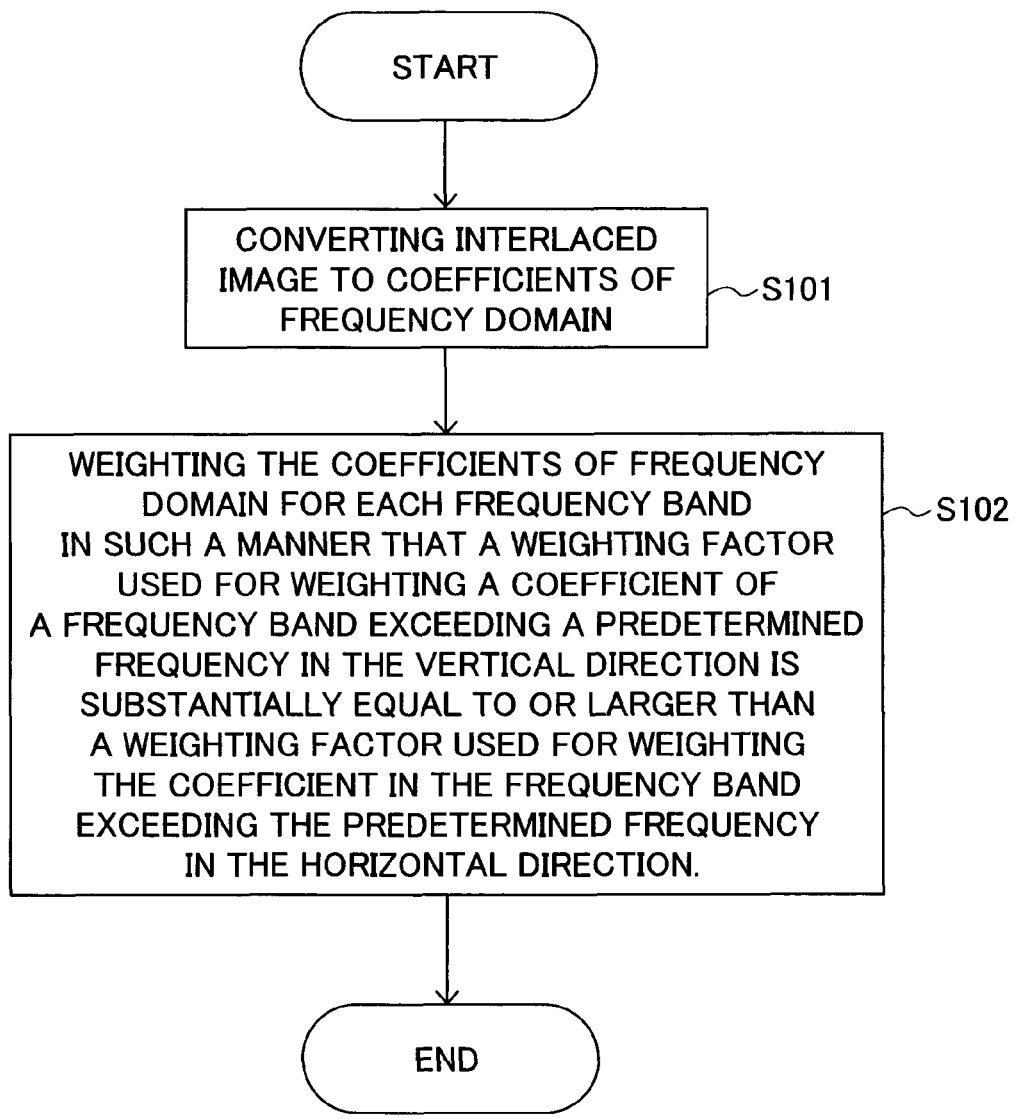

ENCODING METHOD, ENCODING DEVICE, AND ENCODING PROGRAM FOR ENCODING INTERLACED IMAGE

TECHNICAL FIELD

The present invention relates to an encoding method, an encoding device and an encoding program for carrying out frame-based encoding processing of interlaced images.

BACKGROUND ART

In motion picture photography using an interlaced video camera, in order to realize smooth motion without increasing data rate and to reduce flickering, an interlaced scan in which a single-frame image is divided into a top field and a bottom field every other line, each field is scanned in a horizontal direction, and 50 to 60 fields per second are transmitted, for example, is generally carried out for the motion picture photography. Encoding methods for a video signal in the interlaced structure photographed as above (hereinafter referred to as "interlaced image") include an encoding method for encoding individual interlaced images in each field (hereinafter referred to as "field-based encoding"), and an encoding method for encoding a non-interlaced image synthesized by two sequential interlaced images for each frame (hereinafter referred to as "frame-based encoding").

Since the interlaced image in each field has skipped scanning lines, pixel correlation in a vertical direction is weaker than that of the non-interlaced image synthesized by two sequential interlaced images for each frame with a continuous scanning line. Therefore, in view of compression efficiency, the frame-based encoding is typically more advantageous than the field-based encoding.

DISCLOSURE OF THE INVENTION

Problems to be Solved by the Invention

However, if amount of motion of a photographic subject is large, image data may leak between interlaced images of two fields constituting a single-frame non-interlaced image. If such non-interlaced image is reproduced for each field, a flickering noise occurs particularly at a leak portion. An example is considered of a non-interlaced image of a frame obtained by synthesizing interlaced images of two fields: an interlaced image of an N-th field and an interlaced image of the subsequent (N+1)-th field. As shown in FIG. 16, when a subject moves to the left between the interlaced images of two fields, an edge portion of the subject in a single-frame non-interlaced image is displaced in a "comb shape" by plural pixels only in each scanning line. The interlaced images of the two fields are encoded and then decoded as a single-frame non-interlaced image. Conventionally, due to this "comb shape", if a decoded non-interlaced image in each frame is field-divided and interlace-displayed again on a television receiver or the like, there is a problem in that a portion looking like an "afterimage", in which the original image and the portion displaced in the "comb shape" are added together, appears on the interlaced image of each field. This is called an "afterimage phenomenon".

In order to obtain desired image quality, weighting is controlled for each subband based on a contrast sensitivity taking into consideration features of human visual perception. For example, in the JPEG2000 wavelet transform, weighting is carried out using features of visual perception in a frequency region so as to delete (truncate) unnecessary portions. Since the above "afterimage" phenomenon easily occurs in a high-frequency subband in the vertical direction, it is known that a high-frequency component in the vertical direction is preserved with priority, and the "afterimage", which is unnatural image deterioration, can be effectively restricted by suppressing the quantization of this subband.

Japanese Patent Laid-Open Publication No. 2005-65230A discloses controlling quantization and truncation so as to leave the comb shape caused by motion between the fields during a flow of frame-based encoding of an interlaced image, in order to suppress unnatural image quality deterioration such as the "afterimage phenomenon", and to obtain favorable image quality. Also, Japanese Patent Laid-Open Publication No. 2005-233926 discloses subband encoding using a CSF (Contrast Sensitivity Function) as visual weighting in the frame-based encoding of the interlaced image.

However, Japanese Patent Laid-Open Publication No. 2005-65230A discloses only that the "comb shape" by the interlaced image appears as the high-frequency component, and does not pay attention to a problem specific to a frame consisting of the interlaced images of the two fields. Also, since Japanese Patent Laid-Open Publication No. 2005-65230A does not specifically refer to degree of visual importance of the high-frequency component, it does not succeed in deriving an optimal method of determining a ratio of weighting the high-frequency component included in coefficients of high-frequency subbands and the low-frequency component included in coefficients of low-frequency subbands. Moreover, in the encoding method using CSF described in Japanese Patent Laid-Open Publication No. 2005-233926, a method of automatically determining static weight in each frequency region is not disclosed. It is possible to reduce such noise by increasing the bit rate, but that complicates configuration and increases costs.

Therefore, in view of the above problems, it is an object of the present invention to provide an encoding method, an encoding device, and an encoding program for encoding a motion picture of high quality in a simple and effective manner even if the bit rate is not so high, by examining causes of the problem specific to a frame consisting of interlaced images of two fields, by deriving a relation of weighting of the high-frequency component and the low frequency component, and particularly an optimal method therefor, and by revealing a method of automatically determining the static weight of each frequency region. Moreover, in addition to the above features, it is an object of the present invention to provide an encoding method, an encoding device, and an encoding program for encoding an interlaced image in a simpler and more effective manner, not by applying uniform weighting to coefficients of high frequency bands in every case, but by giving consideration to the coefficients of the high frequency bands representing motion.

Means for Solving the Problems

In accordance with a first aspect of the present invention, there is provided an encoding method for carrying out frame-based encoding processing of an interlaced image, the method comprising: a frequency conversion step of converting the interlaced image to coefficients of frequency domain having predetermined frequency ranges in a vertical direction and a horizontal direction, respectively; and a weighting step of weighting the coefficients of frequency domain for each frequency band; wherein in the weighting step, a weighting factor used for weighting a coefficient of a frequency band exceeding the predetermined frequency in the vertical direction is substantially equal to or larger than a weighting factor used for weighting the coefficient in the frequency band exceeding the predetermined frequency in the horizontal direction.

The present encoding method can give an effective visual weighting to the high-frequency component, included in coefficients of frequency bands in the vertical direction exceeding a predetermined frequency, which conventionally has been difficult to be effectively used as the aliasing component, similar to the low-frequency component to be effectively used, to enable encoding of a motion picture with high quality in a simpler and effective manner even if the bit rate is not so high, since the encoding method comprising: a frequency conversion step of converting the interlaced image to coefficients of frequency domain having predetermined frequency ranges respectively in a vertical direction and a horizontal direction; and a weighting step of weighting the coefficients of frequency domain for each frequency band, wherein a weighting factor used for weighting a coefficient of a frequency band exceeding a predetermined frequency in the vertical direction is substantially equal to or larger than a weighting factor used for weighting the coefficient in the frequency band exceeding the predetermined frequency in the horizontal direction.

Further, according to the present invention, the predetermined frequency in the vertical direction may be a frequency located at an intermediate position in the predetermined frequency range in the vertical direction.

In the present encoding method, a frequency at an intermediate position in the predetermined frequency range in the vertical direction may be employed as the predetermined frequency in the vertical direction, to carry out subband decomposition on the coefficients once each in the horizontal direction and the vertical direction, respectively, decompose the coefficients into a set of subbands including the horizontally low-passed and vertically high-passed subband (LH1) and the horizontally high-passed and vertically high-passed subband (HH1) and into a set of subbands including subbands other than these subbands, and give effective visual weights to the set of subbands including the vertical high-frequency component that would cause aliasing into the vertical low-frequency component.

Further, according to the present invention, in the aforementioned weighting step, the coefficients of frequency domain may be weighted in accordance with a visual frequency characteristic for each frequency band, and the weighting factor used for weighting a coefficient of a frequency band exceeding the predetermined frequency in the vertical direction is substantially equal to or larger than the weighting factor used for weighting the coefficient in the frequency band exceeding the predetermined frequency in the horizontal direction determined in accordance with the visual frequency characteristic.

The present encoding method can give an effective visual weighting to the high-frequency component, which conventionally has been difficult to be effectively used as the aliasing component, similar to the low-frequency component to be effectively used, since the coefficients of frequency domain may be weighted in accordance with a visual frequency characteristic for each frequency band, and the weighting factor used for weighting a coefficient of a frequency band exceeding the predetermined frequency in the vertical direction may be substantially equal to or larger than the weighting factor used for weighting the coefficient exceeding the predetermined frequency in the horizontal direction determined in accordance with the visual frequency characteristic.

Further, according to the present invention, in the weighting step, the weighting factor used for weighting a coefficient of a frequency band exceeding the predetermined frequency in the vertical direction may be determined in accordance with a modified visual frequency characteristic obtained by flipping a visual frequency characteristic applied to a frequency equal to or smaller than the predetermined frequency in the vertical direction so that the modified visual frequency characteristic is symmetrical with respect to the predetermined frequency in the vertical direction.

The present encoding method gives visual weighting to the vertical high-frequency component equal to that for the low-frequency component, so that the vertical high-frequency component can be optimally utilized, since, in the weighting step, the weighting factor used for weighting a coefficient of a frequency band exceeding the predetermined frequency in the vertical direction may be determined in accordance with a modified visual frequency characteristic obtained by flipping a visual frequency characteristic applied to a frequency equal to or smaller than the predetermined frequency in the vertical direction so that the modified visual frequency characteristic is symmetrical with respect to the predetermined frequency in the vertical direction.

Further, according to the present invention, the visual frequency characteristic may be represented by a CSF (Contrast Sensitivity Function).

The present encoding method can weight the coefficients of frequency domain in consideration of features of human visual perception, since the encoding method employs CSF (Contrast Sensitivity Function) as the visual frequency characteristic.

Further, according to the present invention, the frequency conversion step may have a step of carrying out subband decomposition processing.

The present encoding method can weight coefficients of a desired direction, a desired frequency region, or a desired decomposition level selectively from among the coefficients of frequency domain in the vertical direction and the horizontal direction.

Further, according to the present invention, the encoding method may further comprise a step of analyzing the interlaced image and extracting a characteristic, and a step of determining a weighting factor for weighting a coefficient of a frequency band exceeding a predetermined frequency in the vertical direction in accordance with the characteristic.

The present encoding method can dynamically and efficiently weight the coefficients in consideration of characteristics of the interlaced image analyzed and extracted, such as the ratio between the high-frequency component and the low-frequency component, brightness, the ratio between a moving portion and a stationary portion in the image, the motion amount of the subject, and the like, since the encoding method further comprises an analyzing step of analyzing the interlaced image and extracting a characteristic; and a determining step of determining a weighting factor for weighting a coefficient of a frequency band exceeding a predetermined frequency in the vertical direction in accordance with the characteristic, and the coefficient of the frequency band exceeding the predetermined frequency in the vertical direction can be weighted in the weighting step in accordance with the weighting factor determined in the determining step.

In accordance with a second aspect of the present invention, there is provided an encoding device for carrying out a frame-based encoding processing of an interlaced image, comprising: a frequency conversion portion for converting the interlaced image to coefficients of frequency domain having predetermined frequency ranges respectively in a vertical direction and a horizontal direction; and a weighting portion for weighting the coefficients of frequency domain for each frequency band, wherein the weighting portion weights a coefficient of a frequency band exceeding a predetermined frequency in the vertical direction with a weighting factor substantially equal to or larger than a weighting factor used for weighting the coefficient in the frequency band exceeding a predetermined frequency in the horizontal direction.

The present encoding device can give an effective visual weighting to the high-frequency component, which conventionally has been difficult to be effectively used as the aliasing component, similar to the low-frequency component to be effectively used, and, therefore, encode a motion picture with a high quality in a simple and effective manner even if the bit rate is not so high, since the encoding device comprising: a frequency conversion portion for converting the interlaced image to coefficients of frequency domain having predetermined frequency ranges respectively in a vertical direction and a horizontal direction; and a weighting portion for weighting the coefficients of frequency domain for each frequency band, wherein the weighting portion weights a coefficient of a frequency band exceeding a predetermined frequency in the vertical direction with a weighting factor substantially equal to or larger than a weighting factor used for weighting the coefficient in the frequency band exceeding a predetermined frequency in the horizontal direction.

Further, according to the present invention, the encoding device may further comprise a control portion for analyzing the interlaced image and extracting a characteristic, and determining a weighting factor for weighting a coefficient of a frequency band exceeding a predetermined frequency in the vertical direction in accordance with the characteristic The present encoding device can dynamically and efficiently weight the coefficients in consideration of characteristics of the interlaced image analyzed by the control portion, such as the ratio between the high-frequency component and the low-frequency component, brightness, the ratio between a moving portion and a stationary portion in the image, the degree of motion of the subject, and the like, since the encoding device further comprises a control portion for analyzing the interlaced image and extracting a characteristic, and determining a weighting factor for weighting a coefficient of a frequency band exceeding a predetermined frequency in the vertical direction in accordance with the characteristic, and the weighting portion can weight the coefficient of the frequency band exceeding the predetermined frequency in the vertical direction in accordance with the weighting factor the characteristic determined by the control portion.

In accordance with a third aspect of the present invention, there is provided an encoding program executable by a computer for carrying out a frame-based encoding processing of an interlaced image, the frame-based encoding processing comprising: a frequency conversion step of converting the interlaced image to coefficients of frequency domain having predetermined frequency ranges respectively in a vertical direction and a horizontal direction, respectively; and a weighting step of weighting the coefficients in the frequency domain for each frequency band, wherein in the weighting step, a weighting factor used for weighting a coefficient of a frequency band exceeding a predetermined frequency in the vertical direction is substantially equal to or larger than a weighting factor used for weighting the coefficient in the frequency band exceeding the predetermined frequency in the horizontal direction.

The present encoding program allows the computer to give an effective visual weighting to the high-frequency component, which conventionally has been difficult to be effectively used as the aliasing component, similarly to the low-frequency component to be effectively used, and, therefore, encode a motion picture with a high quality in a simple and effective manner even if the bit rate is not so high, since the frame-based encoding processing comprising: a frequency conversion step of converting the interlaced image to coefficients in the frequency domain having predetermined frequency ranges respectively in a vertical direction and a horizontal direction; and a weighting step of weighting the coefficients in the frequency domain for each frequency band, wherein in the weighting step, a weighting factor used for weighting a coefficient of a frequency band exceeding a predetermined frequency in the vertical direction is substantially equal to or larger than a weighting factor used for weighting the coefficient in the frequency band exceeding the predetermined frequency in the horizontal direction.

BRIEF DESCRIPTION OF THE DRAWINGS

FIG. 9 is a flow diagram explaining an encoding method carried out by the encoding device shown in FIG. 1;

EXPLANATION OF REFERENCE NUMERALS

Figure 1:
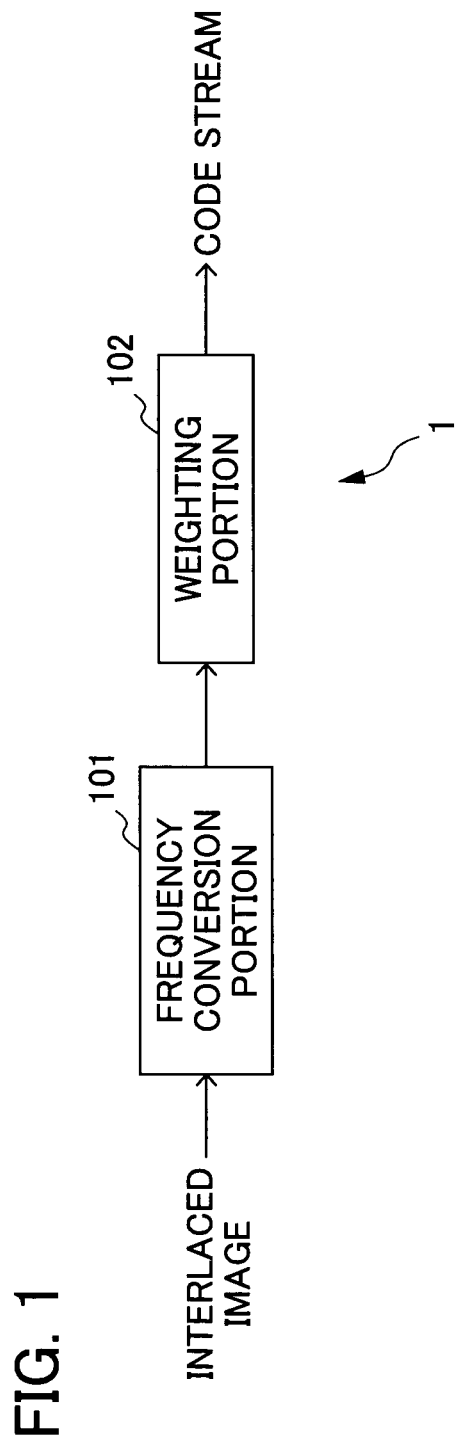
FIG. 1 is an outline functional block diagram of a first embodiment of an encoding device according to the present invention.

1 Encoding device (first embodiment)
101 Frequency conversion portion
102 Weighting portion
2 Encoding device (second embodiment)
201 Frequency conversion portion
202 Weighting portion
203 Control portion
205 Discrete wavelet conversion portion 206 Control portion
207 Quantization and encoding portion
301 Interlaced image
302 Subband coefficients
303 Subband weights
$V_1$-$V_4$ Moving object
$T_0'$, $T_1'$ Top field decoded by the related art
$B_0'$, $B_1'$ Bottom field decoded by the related art
$T_0$, $T_1$ Top field decoded by the present embodiment
$B_0$, $B_1$ Bottom field decoded by the present embodiment

PREFERRED MODE FOR CARRYING OUT THE INVENTION

Referring to FIG. 1 to FIG. 8, a first embodiment of an encoding device according to the present invention is described below.

First Embodiment

FIG. 1 is an outline functional block diagram of a first embodiment of an encoding device 1 according to the present invention, executing a first embodiment of an encoding method. As shown in FIG. 1, the present embodiment of the encoding device 1 is provided with a frequency conversion portion 101 that converts an interlaced image to coefficients of frequency domain having predetermined frequency ranges respectively in a vertical direction and a horizontal direction, and a weighting portion 102 that weights the coefficients of the frequency domain in the vertical direction and the horizontal direction for each frequency band. The weighting portion 102 of the present embodiment most cases gives a larger weighting to a coefficient of a frequency band exceeding a predetermined frequency in the vertical direction than to the coefficient of the frequency band exceeding the predetermined frequency in the horizontal direction.

The coefficients of the frequency domain converted by the frequency conversion portion 101 are transmitted to a quantization portion (not shown) and quantized, and the quantized coefficients are transmitted to an entropy encoding portion (not shown) to be entropy-encoded so as to generate a code stream. Since arrangements known to those skilled in the art can be applied for the quantization portion and entropy encoding portion, a detailed description will be omitted in this description. The weighting portion 102 may weight the coefficients of the frequency domain converted by the frequency conversion portion 101 preferably by controlling the quantization portion (not shown) or the entropy encoding portion (not shown).

Referring to FIGS. 2 to 8, encoding processing executed by the present embodiment of the encoding device 1 is described below.

Figure 16:
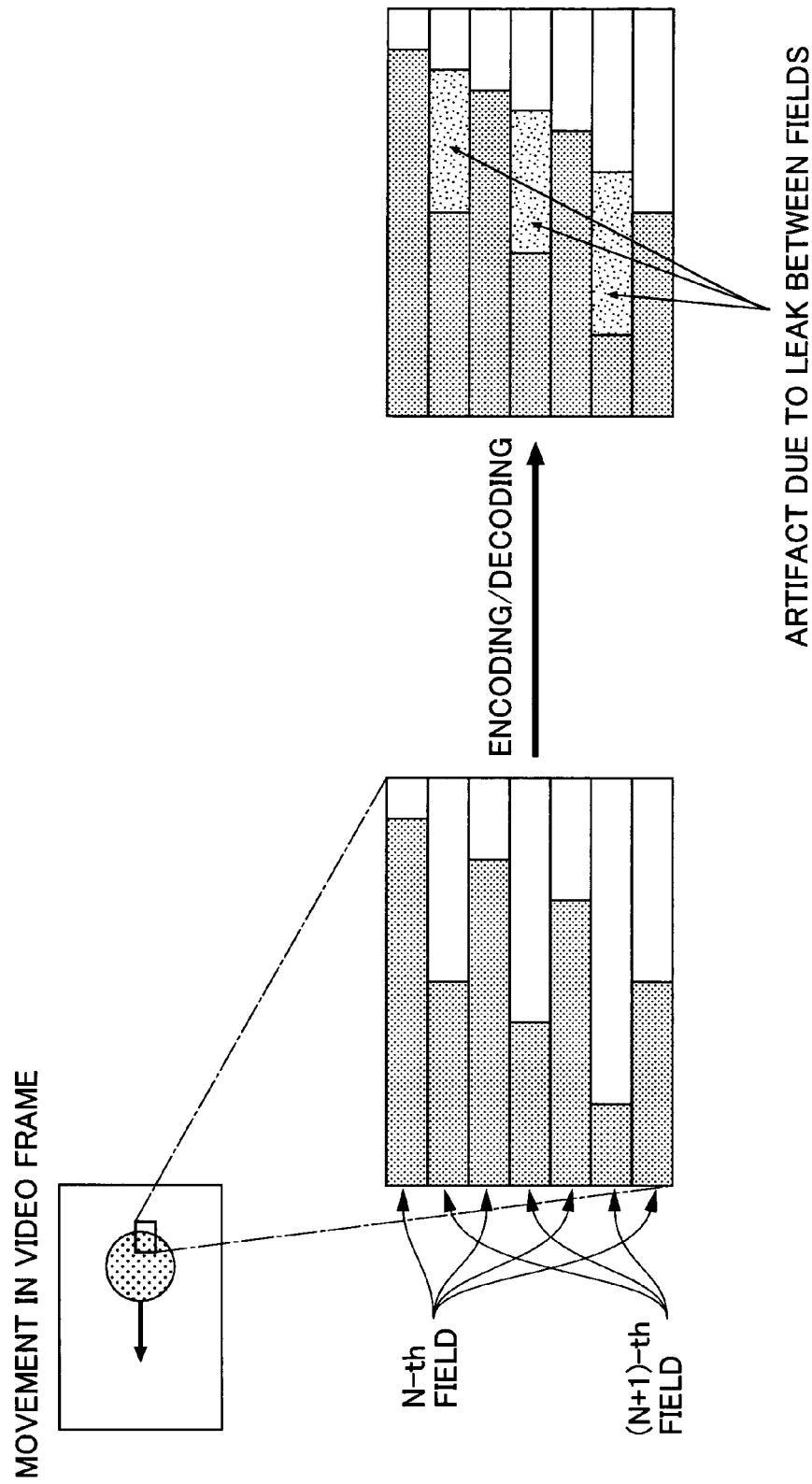
FIG. 16 is a view explaining an "afterimage" occurring as a result of the conventional frame-based encoding of the interlaced image.

As already described, the appearance of the "comb shape" as a high frequency component of the interlaced image is well known. The inventor first examined the problem specific to the frame consisting of the interlaced images of the two fields in order to encode the interlaced images more easily and effectively. Now, referring to FIGS. 2 and 3, the cause of the "afterimage" described referring to FIG. 16 is explained below.

Figure 2:
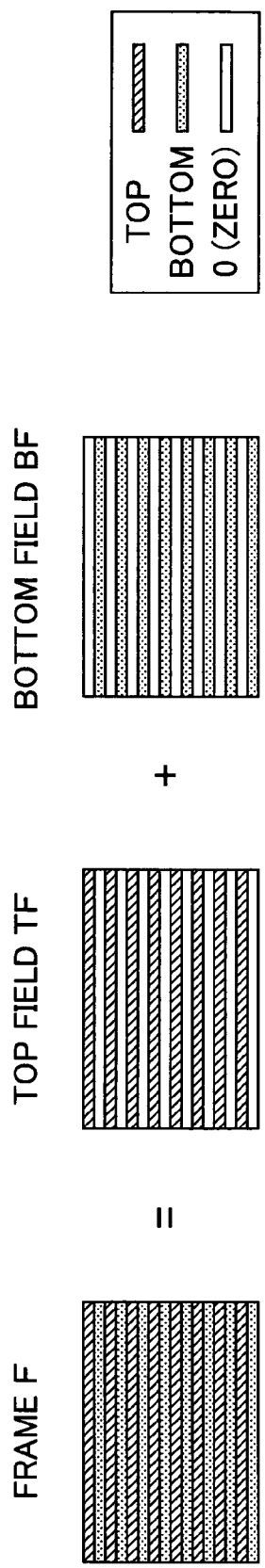
FIG. 2 is a view explaining an interlaced image.

As shown in FIG. 2, a single frame F is divided into a top field TF formed by an interlaced image generated by scanning even-numbered scanning lines in the vertical direction, and a bottom field BF formed by an interlaced image generated by scanning odd-numbered scanning lines in the vertical direction for processing.

Figure 3:
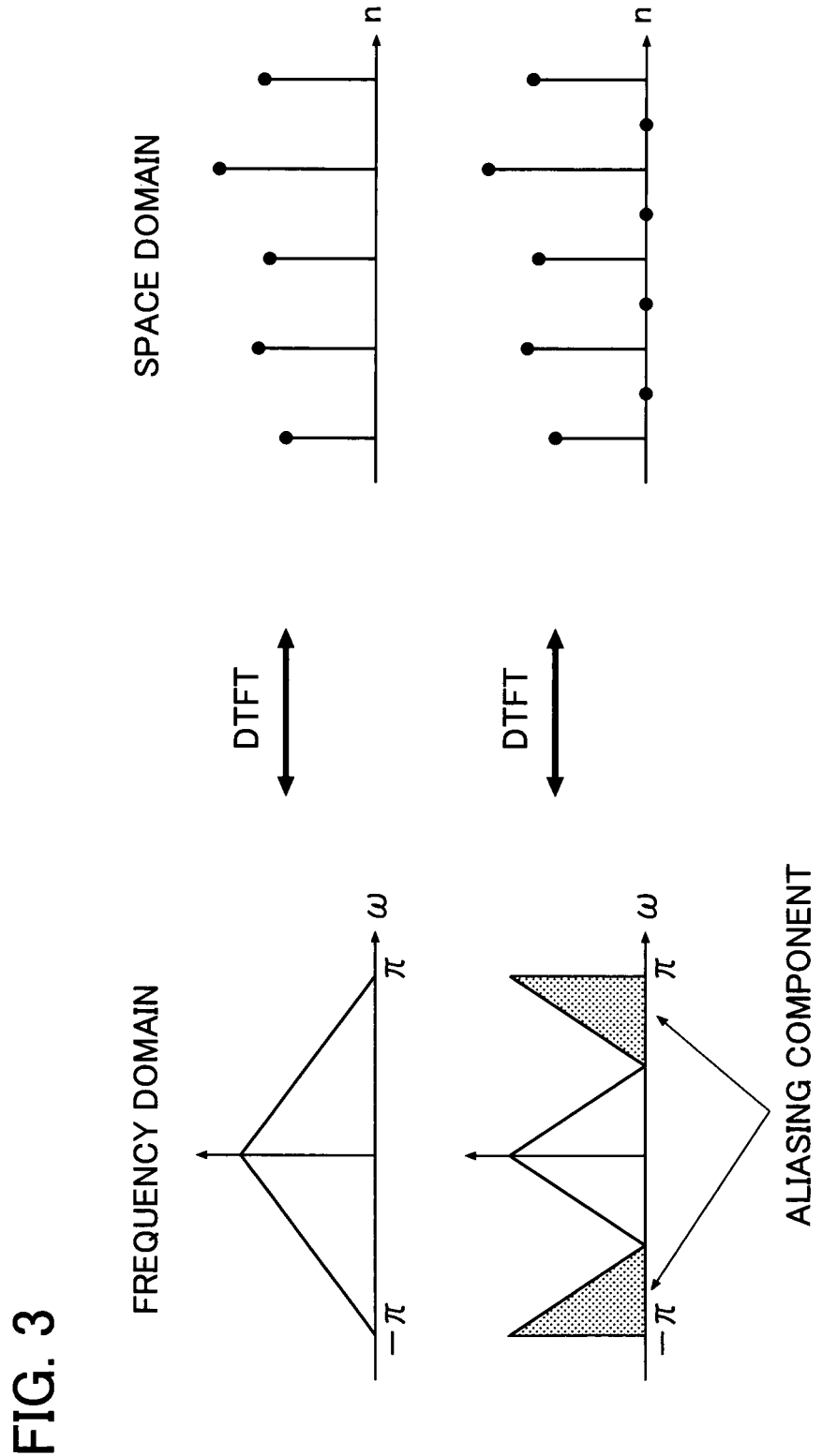
FIG. 3 is a view explaining generation of aliasing.

Here, the frame F consisting of the top field TF and the bottom field BF can be considered a sum of the vertically up-sampled top field TF and the vertically up-sampled bottom field BF, where the up-sampling is done by inserting 0 values in the odd-numbered scanning lines for the up-sampled top field TF and the even-numbered scanning lines for the up-sampled bottom field BF. In the upper part of FIG. 3, a series of pixel values taken from a column of an interlaced image is shown on the right side schematically, while the absolute spectrum obtained by discrete-time Fourier transform (DTFT) of the series of pixel values shown on the right side is shown on the left side schematically. In the lower part of FIG. 3, the series of pixel values obtained by up-sampling the series of pixel values shown on the right side in the upper part of FIG. 3 is shown on the right side schematically, while the absolute spectrum obtained by DTFT of the series of up-sampled pixel values shown on the right side is shown on the left side schematically. In analyzing the leak generated between the fields, since the horizontal and vertical frequencies can be handled separately, only a one-dimensional signal is given attention in the description below.

As can be seen from the lower figure in FIG. 3, in the frequency domain, a portion obtained by folding the original spectrum appears as an aliasing component. Since the summation of the up-sampled fields in the space domain is equal to the summation of the up-sampled fields in the frequency domain, in view of the linearity of the space domain and the frequency domain, in the frame F consisting of the two fields of the top field TF and the bottom field BF, the respective aliasing components are summed in the high-frequency region. Since the original spectrum and the aliasing component are needed in order to reproduce the field structure, they can be considered to have equal visual importance. This point will be given a mathematical examination below.

First, when considering a one-dimensional signal x(n) cut out of the top field in the vertical direction without loss of generality, and a frame signal y(n) up-sampled from x(n) by insertion of 0 values, the following expression holds:

$$\begin{cases} y(2n) = z_0(n) = x(n) \\ y(2n+1) = z_1(n) = 0 \end{cases}$$

where n is an integer, $z_0(n)$ represents the top field, and $z_1(n)$ represents the bottom field. This indicates that the top field $z_0(n)$ is equal to the original signal x(n), and that the bottom field $z_1(n)$ is zero, that is, the leak from the top field is zero. The discrete-time Fourier transform (DTFT) $Y(\omega)$ of y(n) can be expressed as follows:

$$Y(\omega) = \sum_{n=-\infty}^{\infty} y(n)e^{-j\omega n} = \sum_{n=-\infty}^{\infty} x(n)e^{-j(2\omega)n} = X(2\omega)$$

where $j=\sqrt{-1}$ and $X(\omega)$ is a discrete-time Fourier transform of x(n).

From the above, it is known that a spectrum $Y(\omega)$ of the up-sampled signal is equal to one in which the spectrum $X(\omega)$ of the original signal is compressed at a double density. Since the spectrum is compressed, a high-frequency component in which the low-frequency component is folded, that is, aliasing, appears as shown in the lower figure in FIG. 3.

Next, the fact that the aliasing is necessary in order to reproduce the top field by canceling the leak to the bottom field is described below.

By taking the product of the up-sampled signal sampled signal y(n) and a pulse series $p_0(n)=\frac{1}{2}(1+e^{jn})$, the up-sampled top field $v_0(n)=y(n)p_0(n)$ is obtained; by taking the product of the up-sampled signal sampled signal y(n) and a pulse series $p_1(n)=\frac{1}{2}(1-e^{jn})$, the up-sampled bottom field $v_1(n)=y(n)p_1(n)$ is obtained. The discrete Fourier transform $V_0(\omega)$ of $v_0(n)$ can be expressed by the following expression:

$$V_0(\omega) = \sum_{n=-\infty}^{\infty} v_0(n)e^{-j\omega n}$$
$$= \sum_{n=-\infty}^{\infty} y(n)p_0(n)e^{-j\omega n}$$
$$= \frac{1}{2}\sum_{n=-\infty}^{\infty} y(n)(e^{-j\omega n} + e^{-j(\omega-\pi)n})$$
$$= \frac{1}{2}(Y(\omega) + Y(\omega-\pi))$$

Similarly, the discrete Fourier transform $V_1(\omega)$ of $v_1(n)$ can be expressed by the following expression:

$$V_1(\omega) = \frac{1}{2}(Y(\omega) - Y(\omega-\pi))$$

By noting that there is a relation of $z_0(n)=v_0(2n)$, $v_0(2n+1)=0$ (where n is an integer) between the original top field $z_0(n)$ and the up-sampled top field $v_0(n)$, the discrete-time Fourier transform of the top field $Z_0(\omega)$ can be expressed by the following expression:

$$Z_0(\omega) = \sum_{n=-\infty}^{\infty} z_0(n)e^{-j\omega n}$$
$$= \sum_{n=-\infty}^{\infty} v_0(2n)e^{-j\omega n}$$
$$= \sum_{n=-\infty}^{\infty} v_0(n)e^{-j(\omega/2)n}$$
$$= V_0(\omega/2)$$
$$= \frac{1}{2}(Y(\omega/2) + Y(\omega/2-\pi))$$

Similarly, by noting that $z_1(n)=v_1(2n+1)$, $v_1(2n)=0$ (where n is an integer), the discrete-time Fourier transform $Z_1(\omega)$ of the bottom field can be expressed by the following expression:

$$Z_1(\omega) = \sum_{n=-\infty}^{\infty} z_1(n)e^{-j\omega n}$$
$$= \sum_{n=-\infty}^{\infty} v_1(2n+1)e^{-j\omega n}$$
$$= e^{-j(\omega/2)}\sum_{n=-\infty}^{\infty} v_0(n)e^{-j(\omega/2)n}$$
$$= e^{-j(\omega/2)}V_1(\omega/2)$$
$$= \frac{e^{-j(\omega/2)}}{2}(Y(\omega/2) - Y(\omega/2-\pi))$$

Here, if the relation of $Y(\omega)=X(2\omega)$ holds, the top field can be reproduced, and the leak to the bottom field becomes zero. In fact, the discrete-time Fourier transform of the top field and the bottom field can be expressed by the following expression using the discrete-time Fourier transform $X(\omega)$ (periodic with $2\pi$) of the original top field:

$$Z_0(\omega) = \frac{1}{2}(X(\omega) + X(\omega-2\pi)) = X(\omega)$$
$$Z_1(\omega) = \frac{e^{-j(\omega/2)}}{2}(X(\omega) - X(\omega-2\pi)) = 0$$

Therefore, the relations of $z_0(n)=x(n)$, $z_1(n)=0$ hold.

Due to the linearity of the Fourier transform, a similar result holds for the frame signal obtained by summing the top field and the bottom field each up-sampled by 0-value insertion.

From the above, it is known that an error in the aliasing component is folded to the low-frequency component. From this fact, the inventor has reached the conclusion that this aliasing is indispensable for reproducing the bottom field by canceling the leak from the top field, and vice versa. That is, the high-frequency component, which conventionally has been difficult to be effectively used as the aliasing component, is preferably given visual weighting equal to that for the low-frequency component, and thus effectively used. In practice, there is a correlation between the fields, and the high frequency is cancelled and made smaller. Thus, it is to be noted that even if weighting equal to that for the low-frequency component is given to the high-frequency component, the bit allocation for the high-frequency component is typically smaller than the bit allocation for the low-frequency component.

Figure 4:
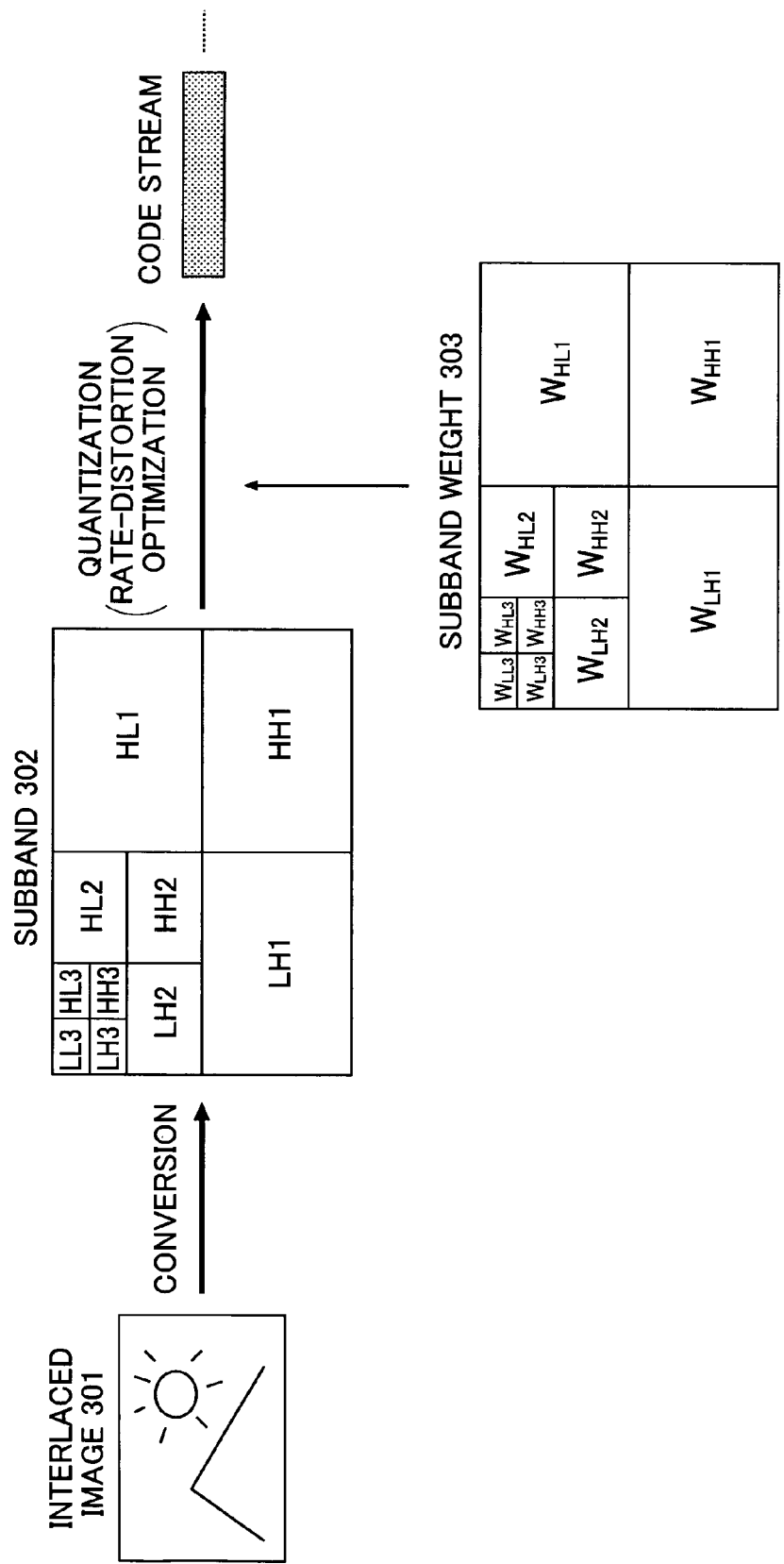
FIG. 4 is a view explaining weighting processing carried out by the encoding device shown in FIG. 1.

Referring to FIG. 4, the weighting of the high-frequency component in the present embodiment is described below in more detail. In the present embodiment of the encoding device 1, as shown in FIG. 4, after a frequency conversion portion 101 (see FIG. 1) converts an interlaced image 301 to coefficients of frequency domain, subband decomposition is carried out, and subband coefficients 302 are generated in which the coefficients of frequency domain are decomposed vertically and horizontally. A weighting portion 102 (see FIG. 1) sends out subband weights 303, which is described later in detail, for example, to a quantization portion (not shown). The quantization portion quantizes the subband coefficients 302 by reflecting the subband weights 303. The quantization executed by the quantization portion may include explicit or implicit quantization, such as PCRD optimization (Post-Compression Rate-Distortion Optimization) of JPEG2000, for example.

Figure 5:
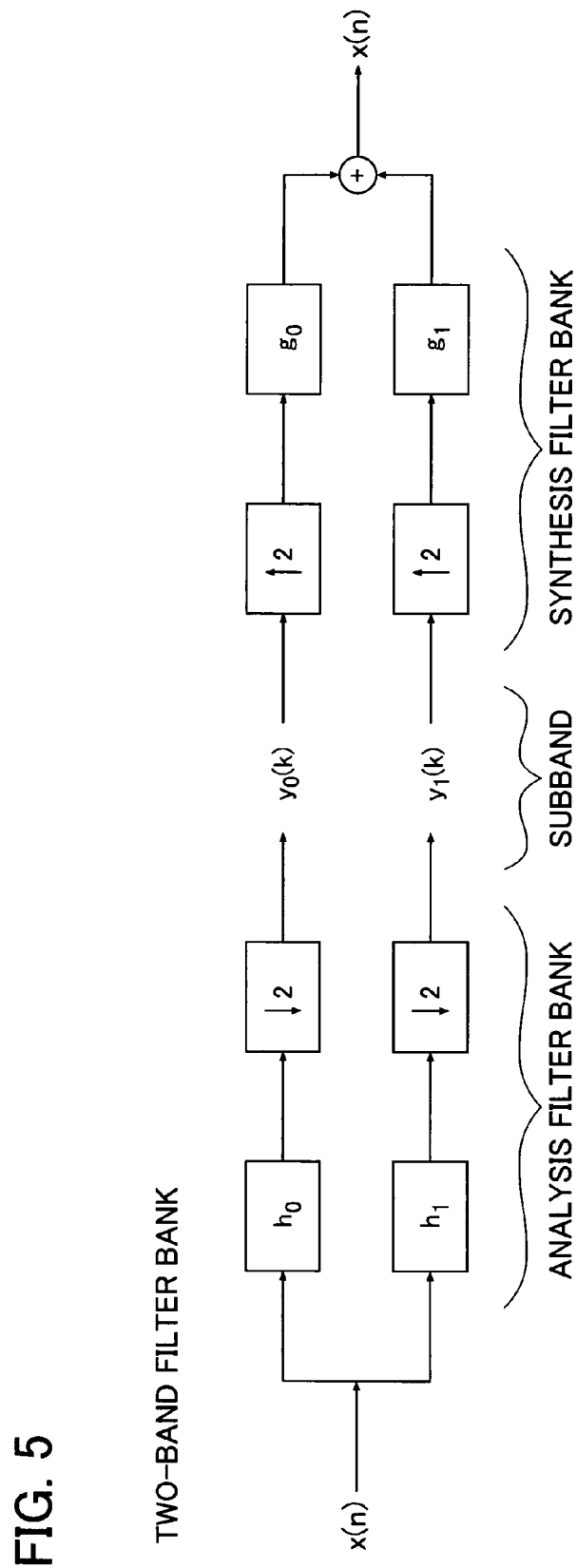
FIG. 5 is a view explaining a principle of subband decomposition carried out by the encoding device shown in FIG. 1.
Figure 6:
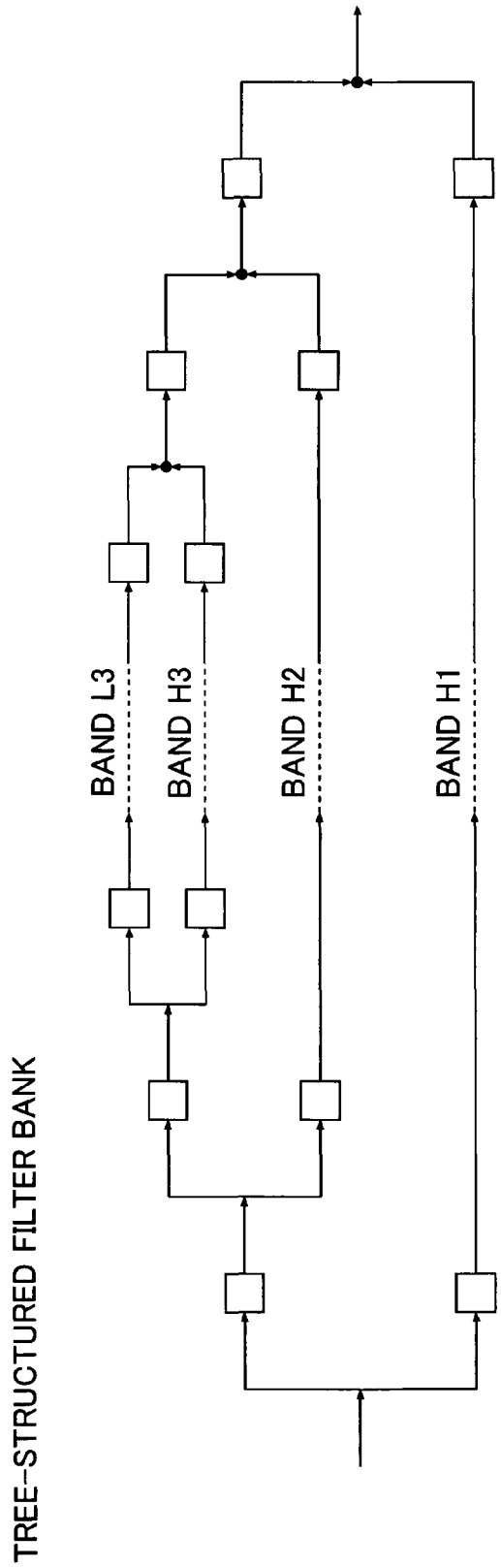
FIG. 6 is a block diagram showing a tree-structured filter bank executing the subband decomposition.

Referring to FIGS. 5 and 6, the subband decomposition in the present embodiment is described below.

The subband decomposition in the present embodiment is realized by a tree structure of a two-band filter bank used in the JPEG2000 shown in FIG. 5, for example. As shown in FIG. 5, if a signal x(n) is inputted into an analysis filter bank, it is divided into signals including a low-frequency component and a high-frequency component by analysis filters $h_0$ and $h_1$, respectively. The analysis filters $h_0$ and $h_1$ are a low-pass filter and a high-pass filter, respectively. By the subsequent decimation processing, a low frequency component $y_0(k)$ and a high frequency component $y_1(k)$, each having half the band width of the signal inputted, are obtained. In one-dimensional case, the low frequency component $y_0(k)$ and the high frequency component $y_1(k)$ are indicative of coefficients of a low-passed subband (referred to as an L subband) and a high-passed subband (referred to as an H subband), respectively. The decimation processing is executed by recursively down-sampling that carries out re-sampling with a frequency lower than the input sampling frequency. As a result, the total band width of the signals is not increased. That is, the total number of samples of x(n) and that of $y_0(k)$ and $y_1(k)$ are identical. In order to restore the original signal, it is necessary to input the subband signals $y_0(k)$ and $y_1(k)$ in the synthesis filter bank. After respective 0-filling processing, they are inputted to the respective synthesis filters $g_0$ and $g_1$ and added together so as to restore the original signal x(n). The 0-filling processing is executed by up-sampling that carries out re-sampling with a frequency higher than the input sampling frequency.

In the tree structure, the low-frequency component is decomposed recursively. From the coefficients of the low-frequency component and high-frequency component obtained in a single decomposition, images with a resolution of ½ of the original image can be obtained. The number of times subband decomposition is done as above is called the decomposition level.

The tree-structured filter bank in the case of subband decomposition with decomposition level 3 is shown in FIG. 6. In FIG. 6, L3 and H3 represent coefficients of a low-frequency band and a high-frequency band at decomposition level 3, respectively. H2 and H1 represent coefficients of the high-frequency bands at decomposition levels 2 and 1, respectively.

The one-dimensional signal x(n) has been examined above, but by sequentially applying the vertical and horizontal filters, similar analysis and synthesis are possible for a two-dimensional signal. In this way, a matrix of subband coefficients 302 in FIG. 4 is created. Two-dimensional signals have separable horizontal and vertical frequency components having a particular frequency range in the horizontal and the vertical direction, respectively. Similarly, two-dimensional subbands obtained by applying two-dimensional subband decomposition to a two-dimensional signal have horizontal and vertical frequency components having a particular frequency range in the horizontal and the vertical directions, respectively, as in the one-dimensional case. In other words, coefficients of a two-dimensional subband, viewed in the horizontal or the vertical direction, are indicative of a horizontal or a vertical frequency component, respectively. Therefore the coefficients, viewed as a two-dimensional subband, have both of the vertical frequency component and the horizontal frequency component. A weighting factor is usually applied to a one-dimensional frequency component, i.e., horizontal or vertical frequency component. The weight applied to a two-dimensional subband is determined from the two weighting factors applied to the horizontal and vertical frequency components included in the subband, in such a way that, for example, the product of the horizontal and vertical weighting factors is used as the weight for the subband. The tree-structured two-band filter bank shown in FIG. 5 is only an example for explanation of the present invention; the present invention can also be realized by various other configurations.

The matrix of subband coefficients 302 is decomposed into ten subbands by the two-dimensional subband decomposition with decomposition level 3. At decomposition level n, the horizontally low-passed and vertically high-passed subband is referred to as LLn, the horizontally high-passed and vertically low-passed subband as HLn, the horizontally low-passed and vertically high-passed subband as LHn, and the horizontally high-passed and vertically high-passed subband as HHn. In the present embodiment, an explanation is given such that the subband decomposition is carried out three times for facilitation of the explanation, but it is clear that the present invention is not limited by the number of times of subband decomposition.

For this matrix of subband coefficients 302 including vertical and horizontal frequency components, visual subband weights 303 indicative of weighting factors used for weighting the coefficients are calculated by the weighting portion 102, and the matrix of subband coefficients 302 is weighted according to the visual subband weights 303 using some means. It may be arranged that the weighting portion 102 sends out the visual subband weights 303 to the quantization portion or entropy encoding portion, and the quantization portion carries out quantization using quantization step sizes inversely proportional to the respective subband weights 303, or that PCRD optimization is carried out using quantization distortion measures of the subband coefficients weighted by the respective subband weights 303, so that the matrix of subband coefficients 302 is weighted according to the subband weights 303 as a result.

Each of visual subband weights 303 can be obtained from the weightings in the vertical direction and the horizontal direction obtained from corresponding visual frequency characteristics. As already described, in order to reproduce the low-frequency component in a field, an aliasing component copied therefrom is needed, and it is preferable to apply a weighting factor equal to that for the low-frequency component to the high-frequency component, which would cause aliasing into the low-frequency component.

Figure 7:
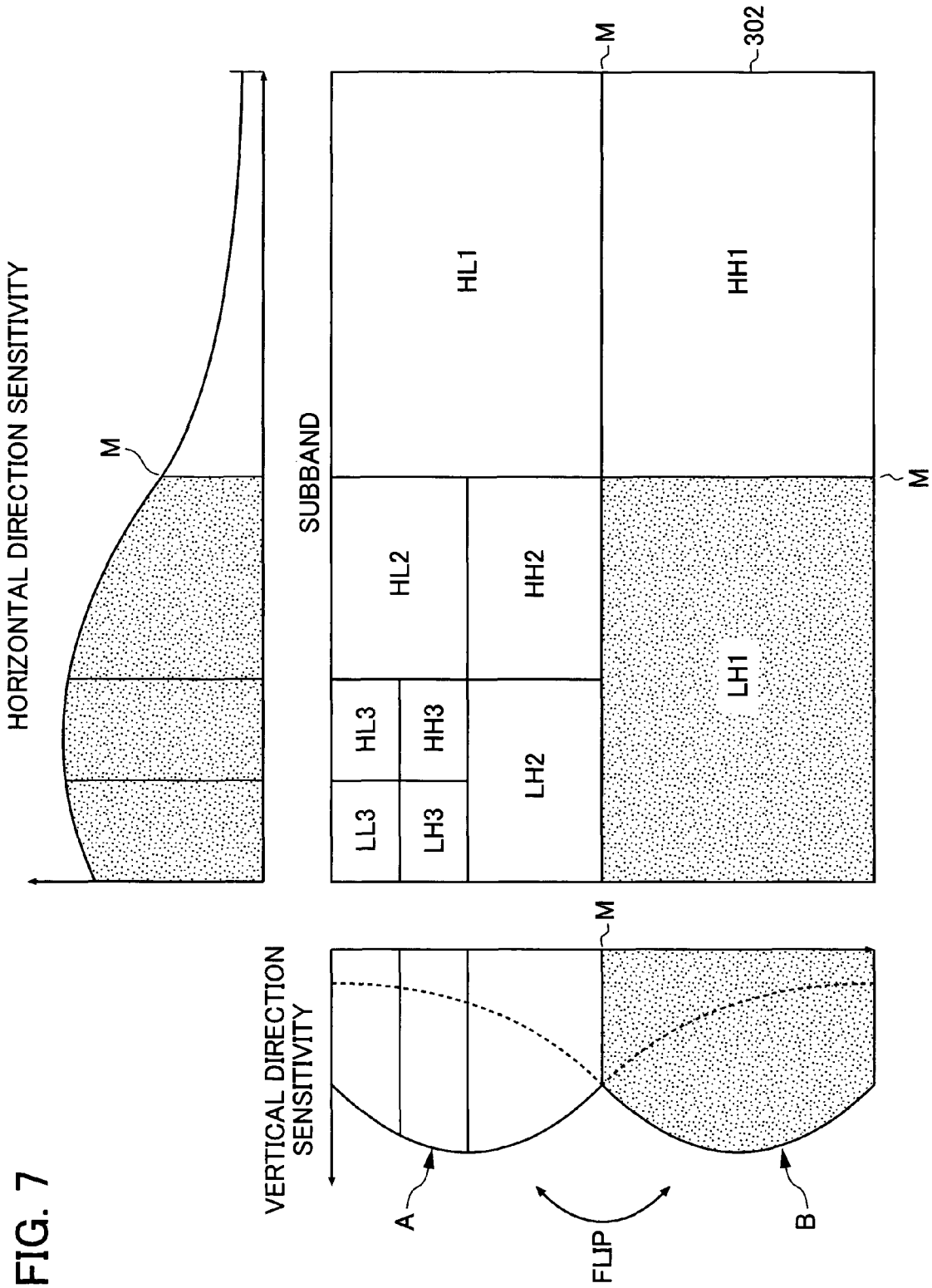
FIG. 7 is a view explaining weighting processing carried out by a weighting portion of the encoding device shown in FIG. 1.

In further detail, as shown in FIG. 7, in the vertical direction, the center frequency M divides the matrix of subbands 302 evenly into a set of subbands consisting of LH1 and HH1 and a set of subbands other than these, while, in the horizontal direction, the center frequency M divides the matrix of subbands 302 evenly into a set of subbands consisting of HL1 and HH1 and a set of subbands other than these. Since, according to the present invention, a frequency component above the central frequency M in the vertical direction is weighted with a weighting factor substantially equal to or larger than a weighting factor used for weighting the frequency component above the central frequency M in the horizontal direction, the subbands LH1 and HH1 have larger weights than with the ordinary visual weighting characteristic. This means that a coefficient in a frequency band exceeding the central frequency M in the vertical direction is weighted with a weighting factor substantially equal to or larger than a weighting factor used for weighting the coefficient in the frequency band exceeding the central frequency M in the horizontal direction determined according to the visual frequency characteristics.

Since, in order to reproduce the low-frequency component of a field, the folded aliasing component of the low-frequency component is needed, it is preferable to apply a modified visual frequency characteristic obtained by flipping the visual frequency characteristic at the center frequency M for the frequency region above M, so that the modified visual frequency characteristic is substantially symmetrical with respect to the center frequency M in the vertical direction. In FIG. 7, if the visual frequency characteristics applied to the coefficients in the frequency bands below and exceeding the central frequency M in the vertical direction are indicated by A and B, respectively, the visual frequency characteristic A and the visual frequency characteristic B are substantially symmetrical with respect to the central frequency M.

Figure 8:
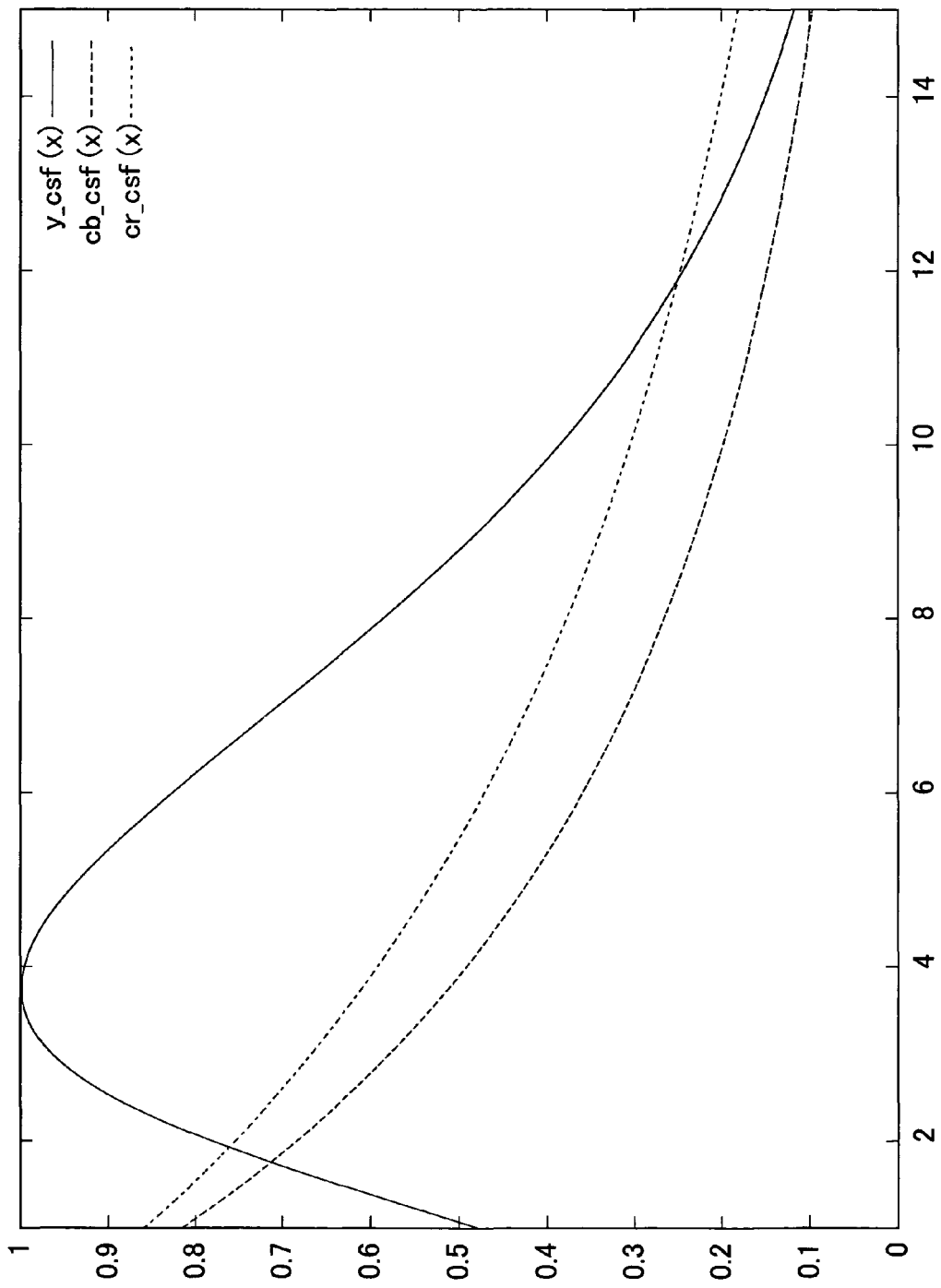
FIG. 8 is a graph showing an example of a Contrast Sensitivity Function (CSF)

As shown in FIG. 8, the contrast sensitivity function (CSF) is preferably used as the visual frequency characteristic, for example. Weighting on the horizontal frequency and vertical frequency components may be carried out so that the sensitivities in the horizontal direction and vertical directions are properly stressed, respectively. Also, the central frequency M is used as a threshold value above which a weighting factor used for weighting a frequency component in the vertical direction is substantially equal to or larger than a weighting factor used for weighting the frequency component in the horizontal direction, but the present invention is not limited to that frequency. As long as the visual frequency characteristic to be applied, such as CSF, for example, can be folded in correspondence with aliasing, any frequency other than the central frequency M is possible. Moreover, considering other characteristics of the interlaced image, such as the ratio between the high-frequency component and the low-frequency component, brightness, the ratio between a moving portion and a stationary portion in the image, the motion amount of the subject, and the like, for example, various adjustments could be made such that a frequency to be a threshold value, above which a weighting factor used for weighting a frequency component in the vertical direction is substantially equal to or larger than a weighting factor used for weighting the frequency component in the horizontal direction, is moved in a direction to be higher or moved in a direction to be lower, or the visual frequency characteristic to be applied, such as CSF, for example, is modified.

As mentioned above, the problem of finding a method of weighting is solved so that the visual weighting can be determined automatically with respect to the contrast sensitivity. Since visual weighting considering aliasing is used, there is an advantage that in a display for each field, even if there is no correlation between the fields, that is, even if motion of the subject is large, the "afterimage" phenomenon, in which a component in one field leaks to the component in the other field, is alleviated.

An example of the CSF used as the visual frequency characteristic is described below. FIG. 8 shows an example of the CSF. Regarding the CSF, a CSF parametric model is proposed in the document by Nadenau, M., entitled "Integration of human color vision models into high quality image compression" (PhD thesis, EPFL, 2000).

$$CSF_L(f) = a_1 f^2 \exp(b_1 f^{c_1}) + a_2 \exp(b_2 f^{c_2})$$

$$CSF_C(f) = a_3 \exp(b_3 f^{c_3})$$

where f represents a frequency in cpd (cycles per degree).

The CSF function Y_CSF for the luminance signal (luma) Y, and the CSF functions Cb_CSF and Cr_CSF for the color difference signals (chroma) Cb and Cr, respectively, are proposed as follows:

$$Y\_CSF(f) = CSF_L(f)|_{a_1=0.997,\, a_2=0.221,\, b_1=-0.97,\, b_2=-0.8,\, c_1=0.758,\, c_2=1.999}$$

$$Cb\_CSF(f) = CSF_C(f)|_{a_3=1.0,\, b_3=-0.2041,\, c_3=0.9}$$

$$Cr\_CSF(f) = CSF_C(f)|_{a_3=1.0,\, b_3=-0.1521,\, c_3=0.893}$$

where f is a frequency in the vertical direction or horizontal direction.

A sampling frequency $f_s$ when a picture is viewed from a certain distance is a function of a viewing distance L.

$$f_s = L \tan(\pi/180) \approx L(\pi/180)$$

where the unit of L is a sampling period in the vertical direction or horizontal direction of the picture, and here the sampling periods in the vertical direction and horizontal direction are assumed to be equal.

For a typical viewing distance L=1700, the highest frequency (Nyquist frequency) included in the picture can be calculated as follows:

$$f_{max} = f_s/2 \approx 15$$

In this way, the highest frequency $f_{max}$ in the vertical/horizontal direction of the CSF in FIG. 8 is calculated.

Referring to FIG. 9, the present embodiment of the encoding method for carrying out frame-based encoding processing of the interlaced image is described below. As shown in FIG. 9, first, a frequency conversion step (S101) of converting the interlaced image to coefficients of frequency domain having predetermined frequency ranges respectively in the vertical direction and horizontal direction is executed, and then a weighting step (S102) of weighting the coefficients of frequency domain for each frequency band is executed. Here, the weighting step (S102) includes a step of weighting the vertical frequency component included in the coefficients of the frequency bands in the vertical direction above a predetermined frequency substantially equal to or larger than weighting the horizontal frequency component included in the coefficients of the frequency bands in the horizontal direction above the predetermined frequency. This means that, in the weighting step (S102), a weighting factor used for weighting a coefficient of a frequency band exceeding a predetermined frequency in the vertical direction is substantially equal to or larger than a weighting factor used for weighting the coefficient in the frequency band exceeding a predetermined frequency in the horizontal direction. Preferably, the predetermined frequency in the vertical direction is a frequency at an intermediate position of the predetermined frequency range in the vertical direction. In the weighting step (S102), the coefficients of frequency domain may be weighted according to the visual frequency characteristics for each frequency band, and the vertical frequency component above the predetermined frequency may be weighted substantially equal to or larger than the weighting in accordance with the visual frequency characteristics. This means that a coefficient of a frequency band exceeding the predetermined frequency in the vertical direction may be weighted with a weighting factor substantially equal to or larger than a weighting factor used for weighting the coefficient of the frequency band exceeding the predetermined frequency in the horizontal direction determined in accordance with the visual frequency characteristics. Preferably, in the weighting step (S102), weighting the vertical frequency component, i.e., a coefficient of a frequency band above the predetermined frequency in the vertical direction is carried out in accordance with a modified visual frequency characteristic obtained by flipping a visual frequency characteristic applied to the frequency component, i.e., the coefficient of the frequency band below the predetermined frequency in the vertical direction, so that the modified visual frequency characteristic becomes symmetrical with respect to the predetermined frequency in the vertical direction.

Comparative Experiment

Experiments for comparing the encoding method according to the present invention and conventional encoding methods are conducted under the following conditions: A weighting portion functions to weight the vertical frequency component above the predetermined frequency by applying the modified visual frequency characteristic obtained by flipping the visual frequency characteristic applied to the frequency component below the predetermined frequency in the vertical direction, so that the modified visual frequency characteristic is symmetrical with respect to the predetermined frequency in the vertical direction.

Input image: 1920×1080i, 29.97 fps, 4:2:2, 8 bits
Bit rate: 50 Mbps
Codec: JPEG2000, frame compression (fields are compressed altogether)
Encoding parameter: The following two types are used:
(a) Weights for interlaced images (the present embodiment);
(b) Weights for progressive images (related art)

Result

Figure 10A:
FIGS. 10A and 10B are images showing an experimental result of comparison between encoding methods carried out by the encoding device shown in FIG. 1 and a conventional encoding device.
Figure 10B:
Figure 11A:
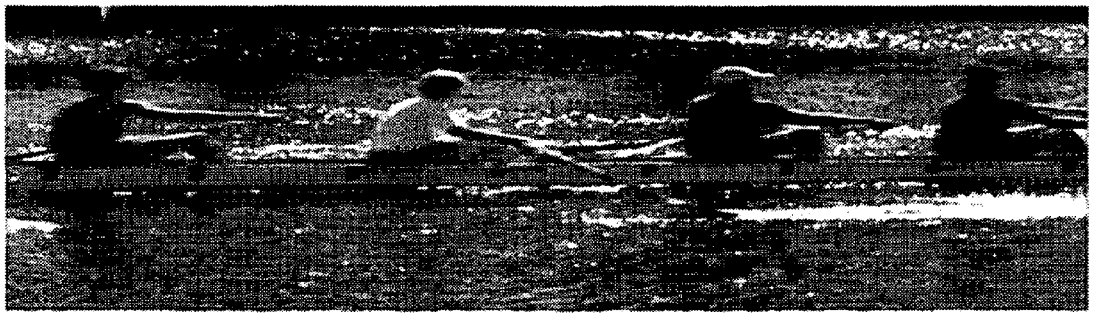
FIGS. 11A and 11B are images showing an experimental result of comparison between encoding methods carried out by the encoding device shown in FIG. 1 and a conventional encoding device.
Figure 11B:

Images obtained as above are shown in FIGS. 10 and 11. In an image including rapid motion, the weights for interlacing in the present embodiment are used in FIGS. 10A and 11A, while the weights for a progressive case are used in FIGS. 10B and 11B. In FIGS. 10B and 11B, a leak from another field is generated in the vicinity of a moving object, and flickering artifacts are confirmed particularly at portions indicated by circles. On the other hand, in FIGS. 10A and 10B, it is recognized that artifacts by leak are alleviated.

Figure 12:
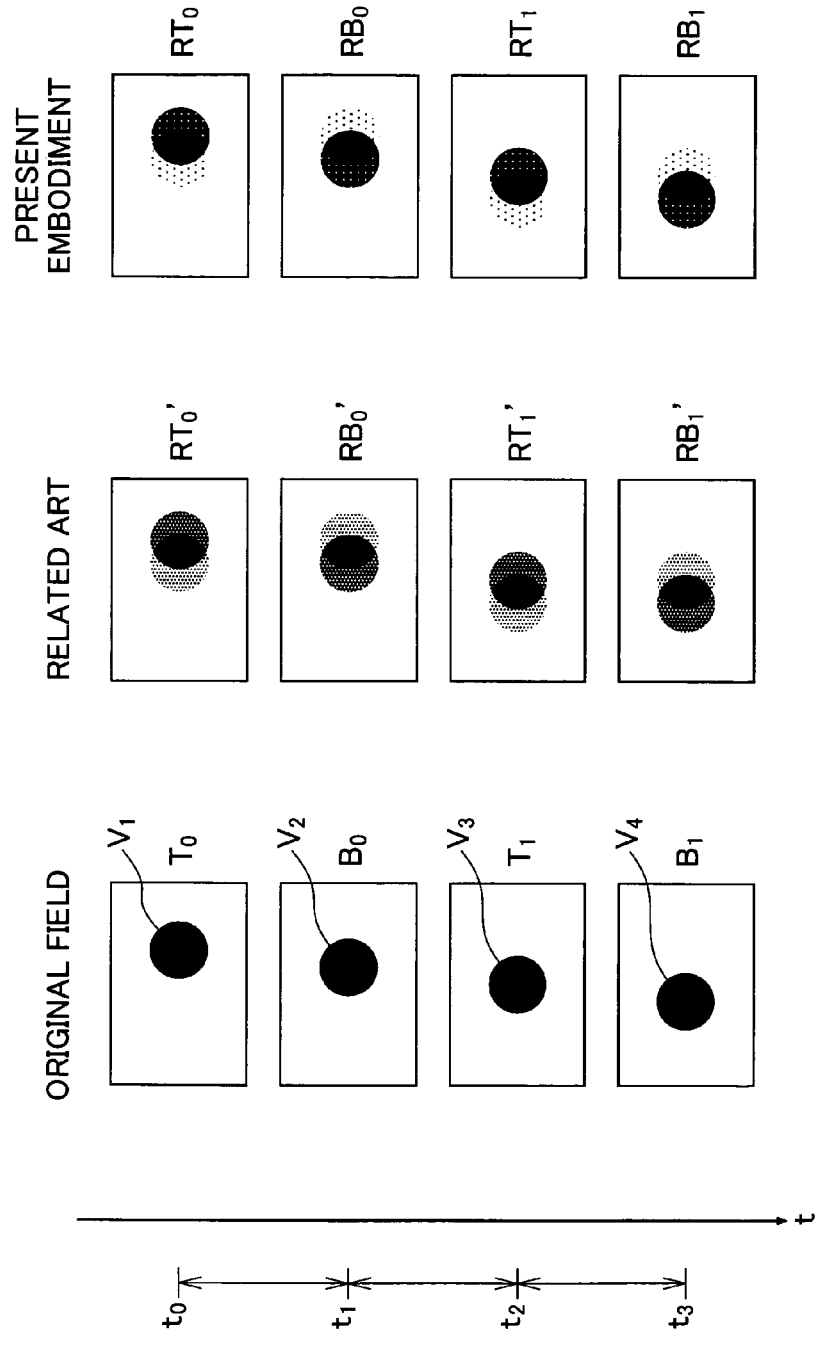
FIG. 12 is a view explaining an effect of the encoding processing carried out by the encoding device shown in FIG. 1.

Referring to FIG. 12, advantages of the present invention are described below. An image in a video frame is moved to the left, and as the time elapses as $t_0 \to t_1 \to t_2 \to t_3$, the object denoted by a filled circle in each of the fields is moved as $V_1 \to V_2 \to V_3 \to V_4$. First, attention is given to $RT_0'$ and $RB_0'$, and $RT_0$ and $RB_0$ are obtained by decoding the top field $T_0$ and bottom field $B_0$ corresponding to the movement of the object in the fields as $V_1$ and $V_2$. Since time $(t_1-t_0)$ has elapsed from when the top field $T_0$ has been photographed until when the bottom field $B_0$ has been photographed, the object in the fields has been moved from $V_1$ to $V_2$. Thus, an afterimage remains as shown by $RT_0'$ and $RB_0'$ with conventional methods. However, since the vertical high-frequency component is weighted substantially equal to or larger with the present embodiment of the method equal to or larger with the present embodiment of the method than with the conventional method, very little afterimage remains as shown by $RT_0$ and $RB_0$. Similarly, in the top field $T_1$ and the bottom field $B_1$ corresponding to the movement of the object in the fields as $V_3$ and $V_4$ as well, time $(t_3-t_2)$ has elapsed from when the top field $T_1$ has been photographed until when the bottom field $B_1$ has been photographed, and the object in the fields has been moved from $V_3$ to $V_4$. Thus, an afterimage remains as shown by $RT_1'$ and $RB_1'$ with conventional methods. However, with the present embodiment of the method, since the vertical high-frequency component is weighted by flipping a visual frequency characteristic applied to the vertical low-frequency component and applying the visual frequency characteristic thus flipped to the vertical high-frequency component, very little afterimage remains as shown by $RT_1$ and $RB_1$.

Also, if the present invention is put into practice using a computer, the present invention may be implemented as hardware or software executing the above functions, or the present invention may be implemented as a computer-readable storage medium in which a program to have the computer execute the above functions is stored. As mentioned above, according to the present invention, an encoding method, an encoding device, and an encoding program for encoding an interlaced image more simply and effectively can be provided by folding the applied visual frequency characteristic, such as CSF, for example, so as to correspond to aliasing.

In the present embodiment, a description is given of a configuration of encoding an interlaced image more simply and effectively by folding the applied visual frequency characteristic, such as CSF, for example, so as to correspond to aliasing, but the present invention is capable of various variations. A configuration is possible in which the applied visual frequency characteristic, such as CSF, for example, is modified, considering other characteristics of the interlaced image, such as the ratio between a moving portion and a stationary portion in an image, for example. This configuration is described in the next embodiment.

Second Embodiment

Figure 13:
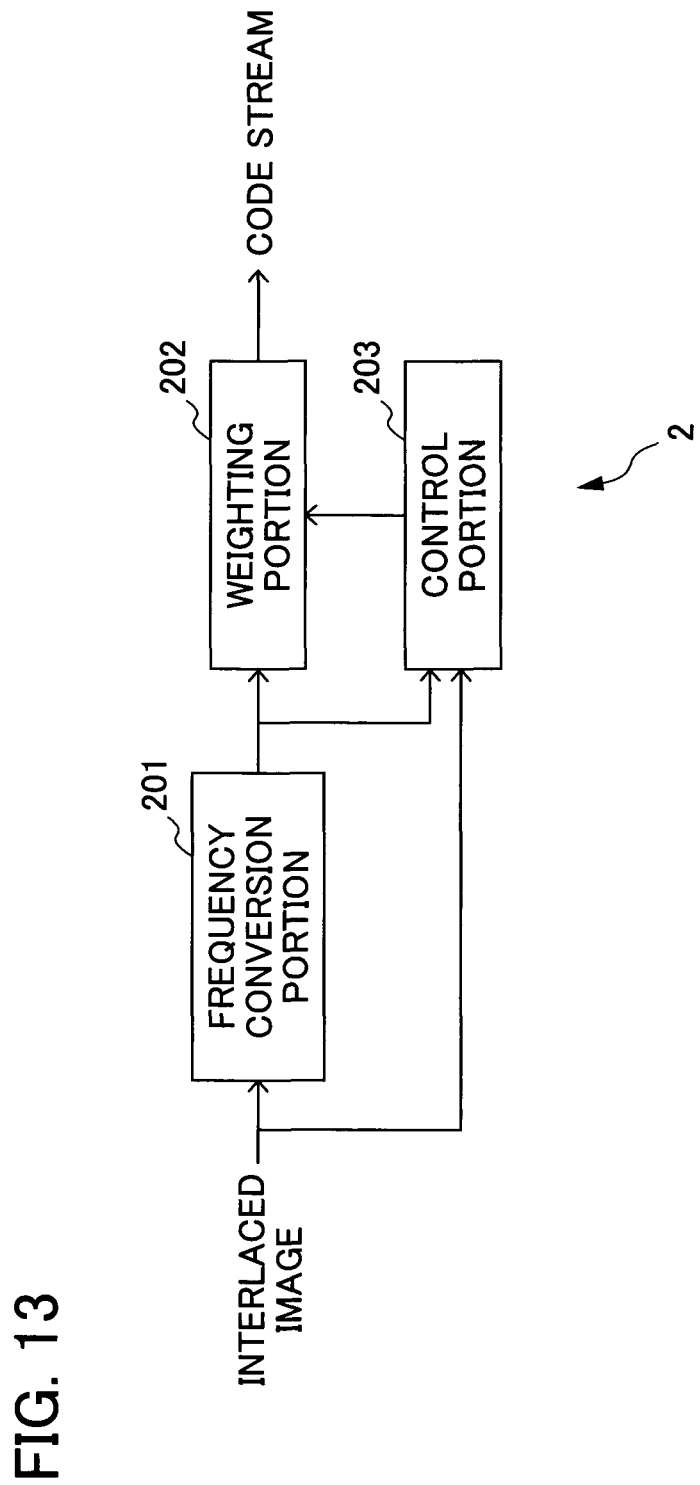
FIG. 13 is an outline functional block diagram of a second embodiment of an encoding device according to the present invention.

FIG. 13 is an outline functional block diagram of an encoding device 2 that executes a second embodiment of an encoding method. As shown in FIG. 13, a configuration of the encoding device 2 of the present embodiment is substantially similar to the encoding device 1 that executes the first embodiment of the encoding method shown in FIG. 1, but differs in that, in addition, a control portion 203 is provided that analyzes the interlaced image and extracts characteristics and determines a control parameter, e.g., a weighting factor, for weighting the vertical frequency component above a predetermined frequency according to the extracted characteristics, and a weighting portion 202 weights the vertical frequency component above a predetermined frequency with a weighting factor possibly larger than that used for weighting horizontal frequency component above the predetermined frequency, according to the control parameter determined by the control portion 203. Only characterizing parts are described below, and configurations similar to the first embodiment are omitted from description.

Specifically, the control portion 203 may modify the weighting at any time, considering a characteristic of an interlaced image, such as the ratio between a high-frequency component and a low-frequency component, brightness, the motion amount of a subject, and the like, for example.

Figure 14:
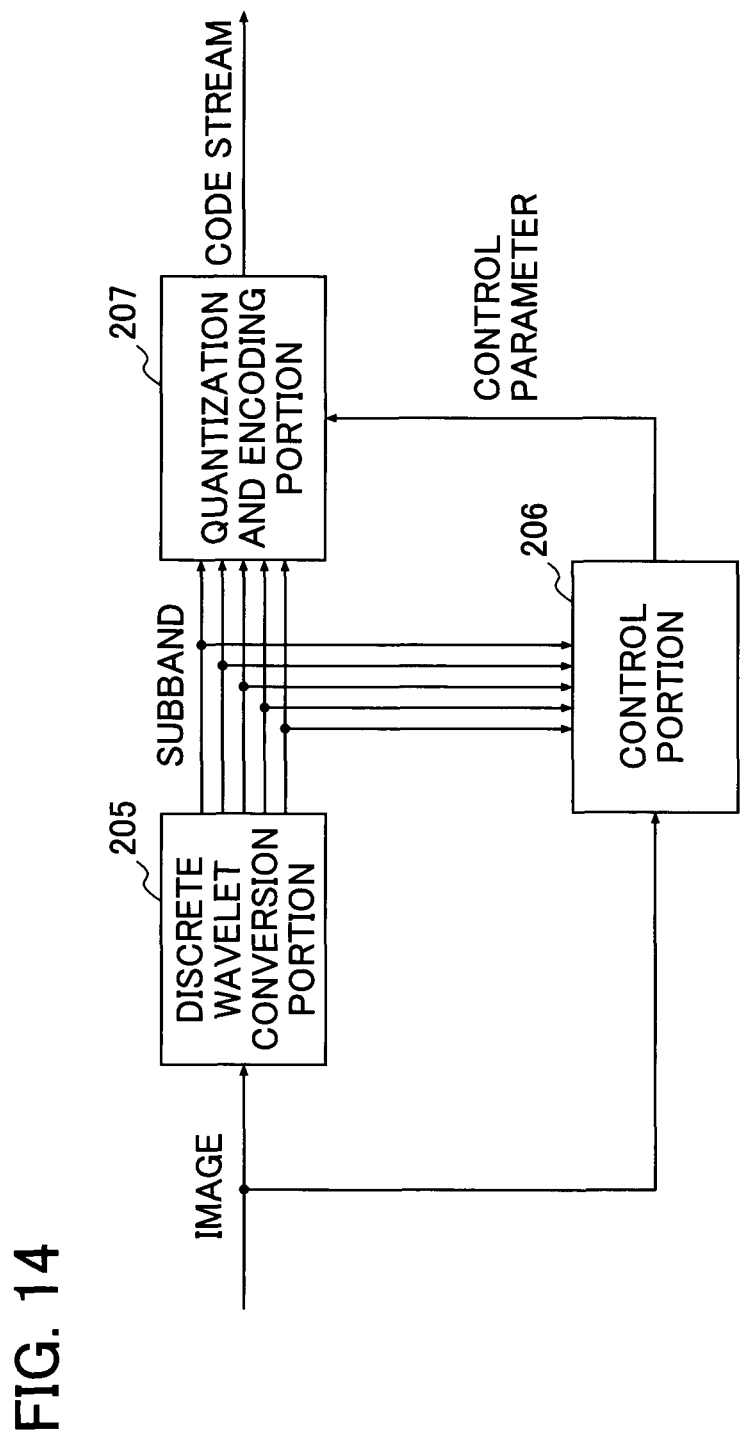
FIG. 14 is a block diagram showing an example of specific construction of the encoding device shown in FIG. 13.

Referring to FIG. 14, a specific construction example that embodies the encoding device 2 of the present embodiment is described below. The present embodiment of the encoding device 2 may include a discrete wavelet conversion portion 205 that carries out discrete-wavelet conversion upon inputting an image and outputs subband coefficients, a control portion 206 that extracts characteristics of the inputted image, and a quantization and encoding portion 207 that quantizes and encodes the subband coefficients outputted from the discrete wavelet conversion portion 205. The control portion 206 controls the operation of the quantization and encoding portion 207 as well. Here, the discrete wavelet conversion portion 205 constitutes the frequency conversion portion 201, and the quantization and encoding portion 207 constitutes the weighting portion 202.

The inputted image is an interlaced image, which is once stored in a buffer memory (not shown), and then outputted. Thus, not only the latest image, but a plurality of past images and images to be processed, that is, future images, may be included. The control portion 206 may extract characteristics of an image from the inputted interlaced image, for example, or extract characteristics of the image from the subband coefficients outputted from the discrete wavelet conversion portion 205, such as subband coefficients of LH1 and HH1 that can be aliasing components, for example.

The control portion 206 may dynamically determine subband weights in accordance with the extracted image characteristics, such as a proportion of motion, for example. Specifically, the control portion 206 may acquire an area ratio $\alpha$ ($0 \le \alpha \le 1$) between a portion with motion in the image and an entire image, from a motion estimate or the like, and calculate a modified contrast sensitivity function CSF'(f) applied to the vertical frequency component above a predetermined frequency, which may be contained in subbands LH1 and HH1, using $\alpha$, for example, as follows:

$$CSF'(f) = \alpha CSF(f_{max}-f) + (1-\alpha)CSF(f)$$

where CSF(f) represents an original contrast sensitivity function (CSF), and CSF($f_{max}$-f) represents the flipped CSF obtained by flipping the above.

The quantization and encoding portion 207 quantizes and encodes the coefficients of the frequency bands containing the vertical frequency component above the predetermined frequency outputted from the discrete wavelet conversion portion 205, such as the coefficients of the vertically high-passed subbands LH1 and HH1, for example, according to the modified contrast sensitivity function CSF'(f) calculated by the control portion 206 as a control parameter.

Also, in the present embodiment, the description has been given for cases where the control portion 206 dynamically determines the subband weights, but in order to reflect the characteristics of the image in the encoding processing more precisely, the control portion may determine weight for each encoding processing unit (code block, for example) obtained by further decomposing the subband into small regions. Specifically, the encoding device may be so configured that the control portion 206 determines the modified contrast sensitivity function CSF'(f) to the vertical frequency component above the predetermined frequency for each code block, and the quantization and encoding portion 207 may quantize and encode the coefficients containing the frequency component above the predetermined frequency in the vertical direction outputted from the discrete wavelet conversion portion 205 for each code block according to the modified contrast sensitivity function CSF'(f) determined by the control portion 206 for each code block.

Figure 15:
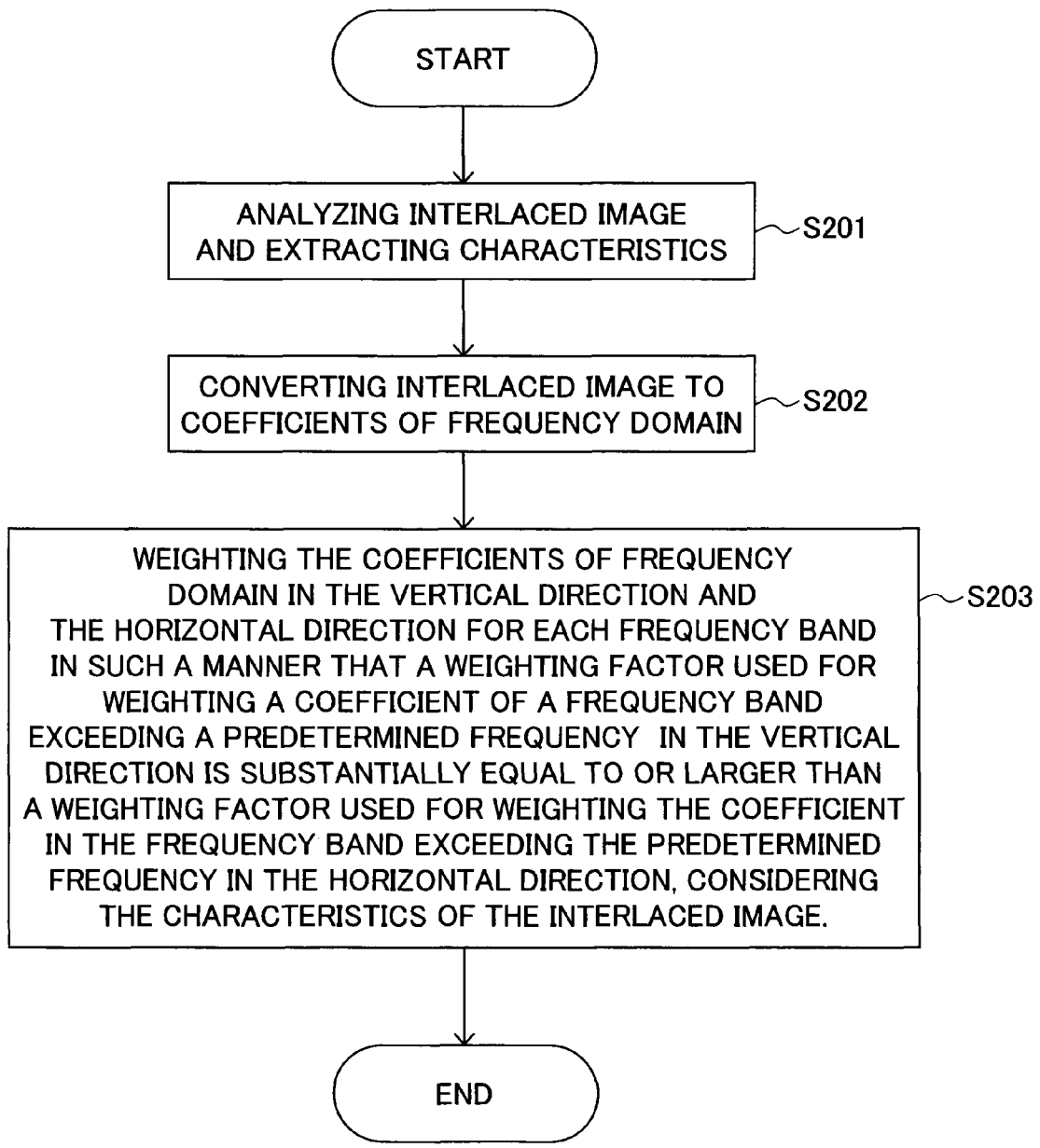
FIG. 15 is a flow diagram explaining an encoding method carried out by the encoding device shown in FIG. 13.

Referring to FIG. 15, the present embodiment of the encoding method for carrying out frame-based encoding processing of the interlaced image is described below. As shown in FIG. 15, first, an analyzing and characteristic extracting step (S201) of analyzing an interlace image and extracting characteristics is executed, then a frequency conversion step (S202) of converting the interlaced image to coefficients of frequency domain having a predetermined frequency ranges in the vertical direction and horizontal direction, respectively, is executed, and next, a weighting step (S203) of weighting the coefficients of frequency domain in the vertical direction and the horizontal direction for each frequency band is executed. Here, the weighting step includes a step of weighting the vertical frequency component above the predetermined frequency substantially equal to or larger than weighting the horizontal frequency component above the predetermined frequency, considering the characteristics of the interlaced image. This means that, in the weighting step (S203), a weighting factor used for weighting a coefficient of a frequency band exceeding a predetermined frequency in the vertical direction is substantially equal to or larger than a weighting factor used for weighting the coefficient in the frequency band exceeding the predetermined frequency in the horizontal direction, considering the characteristics of the interlaced image. The predetermined frequency in the vertical direction is preferably a frequency at an intermediate position in the predetermined frequency range in the vertical direction.

According to the present embodiment as mentioned above, since dynamic and effective weighting is possible, considering the characteristics of the interlaced image analyzed by the control portion, such as the ratio between the high-frequency component and the low-frequency component, brightness, the ratio between a moving portion and a stationary portion in the image, the motion amount of the subject, and the like, for example, an encoding method of an interlaced image, an encoding device, and an encoding program for encoding an interlaced image in a simple and effective manner can be provided.

Also, if the present invention is put into practice using a computer, it may be implemented as hardware or software executing the above functions, or it may be implemented as a computer-readable storage medium in which a program to have the computer execute the above functions is stored. According to the present invention as mentioned above, an encoding method, an encoding device, and an encoding program for encoding an interlaced image in a simple and effective manner can be provided.

The embodiments of the present invention have been described above, but the present invention is not limited to the above-mentioned embodiments. Also, the effects described in the embodiments of the present invention are only set out as optimal ones realized by the present invention, and the effects of the present invention are not limited to those described in the embodiments of the present invention.

For example, in the above embodiments, JPEG2000 is mentioned as an example of an encoding method, but the encoding method to which the present invention can be applied is not limited to JPEG2000. The present invention can be applied to almost any encoding method performing subband decomposition.

The invention claimed is:

1. An encoding method for carrying out frame-based encoding processing of an interlaced image, the encoding method comprising:
   a frequency conversion step of converting the interlaced image to coefficients of frequency domain having predetermined frequency ranges in a vertical direction and a horizontal direction, respectively; and
   a weighting step of weighting the coefficients of frequency domain for each frequency band; wherein:
   in the weighting step, a weighting factor used for weighting a coefficient of a frequency band exceeding a predetermined frequency in the vertical direction is substantially equal to or larger than a weighting factor used or weighting the coefficient in the frequency band exceeding the predetermined frequency in the horizontal direction;
   the coefficients of frequency domain are weighted in accordance with a visual frequency characteristic for each frequency band, and the weighting factor used for weighting a coefficient of a frequency band exceeding a predetermined frequency in the vertical direction is substantially equal to or larger than the weighting factor used for weighting the coefficient exceeding the predetermined frequency in the horizontal direction determined in accordance with the visual frequency characteristic; and
   the weighting factor used for weighting a coefficient of a frequency band exceeding the predetermined frequency in the vertical direction is determined in accordance with a modified visual frequency characteristic obtained by flipping a visual frequency characteristic applied to a frequency equal to or smaller than the predetermined frequency in the vertical direction so that the modified visual frequency characteristic is symmetrical with respect to the predetermined frequency in the vertical direction.

2. An encoding method as set forth in claim 1, wherein the predetermined frequency in the vertical direction is a frequency at an intermediate position in the predetermined frequency range in the vertical direction.

3. An encoding method as set forth in claim 1, wherein the visual frequency characteristic is represented by a CSF (Contrast Sensitivity Function).

4. An encoding method as set forth in claim 1, wherein the frequency conversion step has a step of carrying out subband decomposition processing.

5. An encoding method as set forth in claim 1, further comprising:
- a step of analyzing the interlaced image to extract a characteristic; and
- a step of determining a weighting factor for weighting a coefficient of a frequency band exceeding a predetermined frequency in the vertical direction in accordance with the characteristic.

6. An encoding device for carrying out frame-based encoding processing of an interlaced image, the encoding device comprising:
- a frequency conversion portion for converting the interlaced image to coefficients of frequency domain having predetermined frequency ranges respectively in a vertical direction and a horizontal direction; and
- a weighting portion for weighting the coefficients of frequency domain for each frequency band; wherein:
  - the weighting portion weights a coefficient of a frequency band exceeding a predetermined frequency in the vertical direction with a weighting factor substantially equal to or larger than a weighting factor used for weighting the coefficient in the frequency band exceeding the predetermined frequency in the horizontal direction;
  - the coefficients of frequency domain are weighted in accordance with a visual frequency characteristic for each frequency band, and the weighting factor used for weighting a coefficient of a frequency band exceeding a predetermined frequency in the vertical direction is substantially equal to or larger than the weighting factor used for weighting the coefficient exceeding the predetermined frequency in the horizontal direction determined in accordance with the visual frequency characteristic; and
  - the weighting factor used for weighting a coefficient of a frequency band exceeding the predetermined frequency in the vertical direction is determined in accordance with a modified visual frequency characteristic obtained by flipping a visual frequency characteristic applied to a frequency equal to or smaller than the predetermined frequency in the vertical direction so that the modified visual frequency characteristic is symmetrical with respect to the predetermined frequency in the vertical direction.

7. An encoding device as set forth in claim 6, further comprising a control portion for analyzing the interlaced image and extracting a characteristic, and determining a weighting factor for weighting a coefficient of a frequency band exceeding a predetermined frequency in the vertical direction in accordance with the characteristic.

8. An encoding program on a non-transitory computer-readable medium executable by a computer for carrying out frame-based encoding processing of an interlaced image, the frame-based encoding processing comprising:
- a frequency conversion step of converting the interlaced image to coefficients of frequency domain having predetermined frequency ranges in a vertical direction and a horizontal direction, respectively; and
- a weighting step of weighting the coefficients in the frequency domain for each frequency band, wherein:
  - in the weighting step, a weighting factor used for weighting a coefficient of a frequency band exceeding a predetermined frequency in the vertical direction is substantially equal to or larger than a weighting factor used for weighting the coefficient in the frequency band exceeding the predetermined frequency in the horizontal direction;
  - the coefficients of frequency domain are weighted in accordance with a visual frequency characteristic for each frequency band, and the weighting factor used for weighting a coefficient of a frequency band exceeding a predetermined frequency in the vertical direction is substantially equal to or larger than the weighting factor used for weighting the coefficient exceeding the predetermined frequency in the horizontal direction determined in accordance with the visual frequency characteristic; and
  - the weighting factor used for weighting a coefficient of a frequency band exceeding the predetermined frequency in the vertical direction is determined in accordance with a modified visual frequency characteristic obtained by flipping a visual frequency characteristic applied to a frequency equal to or smaller than the predetermined frequency in the vertical direction so that the modified visual frequency characteristic is symmetrical with respect to the predetermined frequency in the vertical direction.

* * * * *